United States Patent
Porcino

(10) Patent No.: US 7,155,237 B2
(45) Date of Patent: Dec. 26, 2006

(54) METHOD AND SYSTEM FOR DETERMINING POSITION OF A MOBILE TERMINAL UTILIZING TIME OF ARRIVAL CALCULATION IN COMBINATION WITH A TIME DIFFERENCE OF ARRIVAL CALCULATION

(75) Inventor: Domenico G. Porcino, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 456 days.

(21) Appl. No.: 09/961,984

(22) Filed: Sep. 24, 2001

(65) Prior Publication Data

US 2002/0052208 A1    May 2, 2002

(30) Foreign Application Priority Data

Sep. 23, 2000  (GB) ................. 0023366.8

(51) Int. Cl.
*H04Q 7/20* (2006.01)
(52) U.S. Cl. ................. 455/456.1; 455/456.5; 455/456.6; 342/450
(58) Field of Classification Search ............ 455/67.1, 455/404.2, 456.1, 456.2, 524, 457, 456.6, 455/456.5; 342/457, 450, 357.06, 357.05, 342/357.09, 357.08
See application file for complete search history.

(56) References Cited

U.S. PATENT DOCUMENTS

| | | | | |
|---|---|---|---|---|
| 5,758,288 A * | 5/1998 | Dunn et al. ............ | 455/456.5 |
| 5,987,329 A | 11/1999 | Yost et al. ............ | 455/456 |
| 6,009,091 A * | 12/1999 | Stewart et al. ......... | 370/342 |
| 6,040,800 A * | 3/2000 | Raith et al. ........... | 342/387 |
| 6,070,083 A * | 5/2000 | Watters et al. ......... | 455/517 |
| 6,154,657 A * | 11/2000 | Grubeck et al. ........ | 455/456.2 |
| 6,160,511 A * | 12/2000 | Pfeil et al. ........... | 342/457 |
| 6,201,973 B1 * | 3/2001 | Kowaguchi ............ | 455/456.6 |
| 6,233,459 B1 * | 5/2001 | Sullivan et al. ........ | 455/456.2 |
| 6,252,543 B1 * | 6/2001 | Camp ................. | 342/357.06 |
| 6,275,186 B1 * | 8/2001 | Kong ................. | 342/363 |
| 6,327,474 B1 * | 12/2001 | Ruutu et al. .......... | 455/456.1 |
| 6,477,379 B1 * | 11/2002 | Kingdon .............. | 455/456.1 |
| 6,490,454 B1 * | 12/2002 | Kangas et al. ......... | 455/456.1 |
| 6,522,296 B1 * | 2/2003 | Holt ................. | 342/453 |
| 6,526,283 B1 * | 2/2003 | Jang ................. | 455/456.5 |
| 6,529,165 B1 * | 3/2003 | Duffett-Smith et al. ... | 342/463 |
| 6,539,229 B1 * | 3/2003 | Ali .................. | 455/456.1 |
| 6,560,462 B1 * | 5/2003 | Ravi et al. ............ | 455/456.1 |
| 6,671,514 B1 * | 12/2003 | Cedervall et al. ....... | 455/456.1 |
| 6,674,860 B1 * | 1/2004 | Pirila ................ | 380/247 |
| 6,707,422 B1 * | 3/2004 | Sheynblat et al. ...... | 342/357.12 |
| 2001/0004601 A1 * | 6/2001 | Drane et al. .......... | 455/456 |
| 2002/0086682 A1 * | 7/2002 | Naghian .............. | 455/456 |
| 2002/0132623 A1 * | 9/2002 | Kingdon .............. | 455/456 |

\* cited by examiner

FOREIGN PATENT DOCUMENTS

WO    WO9937109    7/1999

*Primary Examiner*—William Trost
*Assistant Examiner*—James D. Ewart
(74) *Attorney, Agent, or Firm*—Michael E. Belk

(57) ABSTRACT

The present invention provides for a method of, and related system for, determining the position of a mobile radio terminal (10,M) arranged for communication with a plurality of base stations ($BS_1$, $BS_2$) and including the steps of employing a Time Of Arrival calculation in combination with a Time Difference Of Arrival calculation, characterized by performing the combined Time of Arrival and Time Difference Of Arrival calculations on signals transmitted in the downlink channel from the base stations ($BS_1$, $BS_2$) to the mobile radio terminal (10,M).

17 Claims, 2 Drawing Sheets

METHOD AND SYSTEM FOR DETERMINING POSITION OF A MOBILE TERMINAL UTILIZING TIME OF ARRIVAL CALCULATION IN COMBINATION WITH A TIME DIFFERENCE OF ARRIVAL CALCULATION

The present invention relates to a method of determining the position of a mobile radio terminal arranged to communicate with a plurality of base stations and including the steps of employing a Time Of Arrival (TOA) calculation in combination with a Time Difference Of Arrival (TDOA) calculation.

A similar combination of different techniques (such as TOA and TDOA) for position location purposes is employed in the international patent application WO-A-99/37109 in the uplink communication channel, i.e. when signals are transmitted from the mobile terminal to the different base stations which are employed with multiple detection calculations performed on the signals received at the base stations. It should be appreciated that employing such combined techniques has the advantage that the number of separate base station measurements required to obtain an accurate determination of the mobile terminals position is reduced. Previously, communication with three base stations was required. However, the combination Of Time of Arrival and Time Difference Of Arrival calculations has reduced the number of required base stations to two in order to obtain a two-dimensional position fix. This can prove advantageous in many mobile communication systems where communication with three base stations can in no way be guaranteed. For example, it has been determined that even for cellular telephones operating in an urban environment, an average 12% of the mobile telephones will not have access to more than two base stations.

The combination of Time Of Arrival and Time Difference Of Arrival calculations improve the accuracy and success rate of position determination for a mobile handset, such a capability is becoming an increasingly important aspect of mobile communication scenarios, particularly those involving the emergency services.

However, systems such as that known from WO-A-99/37109 nevertheless suffer disadvantages. For example, the availability of the improved position determination process is dependent upon network service providers implementing the appropriate functionality at their base stations. Also, if the result of the position determination process is required at the mobile terminal, this is not inherent in the known systems and so the mobile terminal use becomes reliant upon the external network infrastructure, and also increased communication between the base station and the mobile terminal to provide the user with the position information.

Since the potentially problematic communication between base stations and the mobile terminal is at the very heart of the problem addressed in WO-A-99/37109, any scenario requiring additional communication between the base stations and the mobile terminal will serve to limit the effectiveness of such prior art proposals.

Again, the requirement for such additional level of communication emphasizes the dependence of the mobile terminal user on the service providers supporting such a level of base station-terminal communication.

The present invention therefore seeks to provide for a method of determining the position of a mobile terminal, and related apparatus, which exhibits advantages over known such methods.

According to one aspect of the present invention, there is provided a method of determining the position of a mobile radio terminal as defined above and characterised by performing the combined Time Of Arrival and Time Difference Of Arrival calculations on signals transmitted in a downlink communication channel from the base stations to the terminal.

Such method is particularly suitable for compliance with the emerging 3rd generation standard defined within the 3GPP working groups.

The method of the present invention is advantageous in that the position determination calculation is performed in the mobile terminal itself and so is readily available to the terminal user and without the user being dependent upon network characteristics defined by the service provider. Also, there is no need for a separate level of communication once the position determination has been performed in order to deliver the position determination result to the mobile terminal user.

The feature of claim 2 has the advantage that an accurate Time Of Arrival can be readily achieved and so enhancing the combined calculation performed, for example on signals from only two base stations.

The invention also provides for a mobile radio system comprising a plurality of base stations and a mobile radio terminal arranged for communication therewith, characterised in that the mobile radio terminal includes means for performing combined Time Of Arrival and Time Difference Of Arrival calculations on signal transmitted in the downlink channel from the base stations so that the result of the position determination calculation is available directly at the mobile radio terminal.

Further, the invention can provide for a mobile radio terminal characterised by means for performing combined Time Of Arrival and Time Difference Of Arrival calculation on signal transmitted from a plurality of base stations.

The invention is described further hereinafter, by the way of example only, with reference to the accompanying drawings in which.

The general principle behind a mobile terminal positioning system according to the invention is to correlate one of the signals transmitted by the network operator with a local replica of the same signal generated inside the mobile terminal. In accordance with the standard techniques, the peak of correlation that is possible to obtain is positioned at an instant in time that is, directly proportional to the distance travelled by the signal ray. From the basis that the signals travel at the speed of light, it is relatively easy to derive a Time Of Arrival (TOA) delay estimate and from three separate estimates to calculate the position of the mobile via triangulation or hyperbolic simultaneous equations.

The propagation delay of a signal can be determined using the correlation properties of particular sequences (PN sequences) travelling between the transmitter (the operator)

and the receiver (the mobile terminal). Correlating two replica of the same PN sequence serves to produce a strong peak in the correlation function when the two are synchronised. Even in the presence of strong distortion caused for example by multipath and noise effects, the peak is still clearly visible for employment in the position fix process. Such known TOA positioning systems can calculate the unique two-dimensional location of the mobile terminal based on the known absolute position of at least three base stations provided by the network. The actual distance from these three base stations can be determined.

For TOA systems, each base station broadcasts particular messages during its normal operation. If the mobile is within the range of the base station transmission, it will receive the transmission and correlate it with a local replica of the same signal. The radio-waves transmitted from the base station or from the mobile, are assumed to propagate at the speed of light c, and the distance travelled can be therefore calculated simply multiplying c by the propagation time measured. Repeating the same calculation for 3 base stations, the mobile would have an estimate of its distance from them and can then use triangulation for finding its position given the knowledge of the three distances and the three BS co-ordinates.

Figure 1:
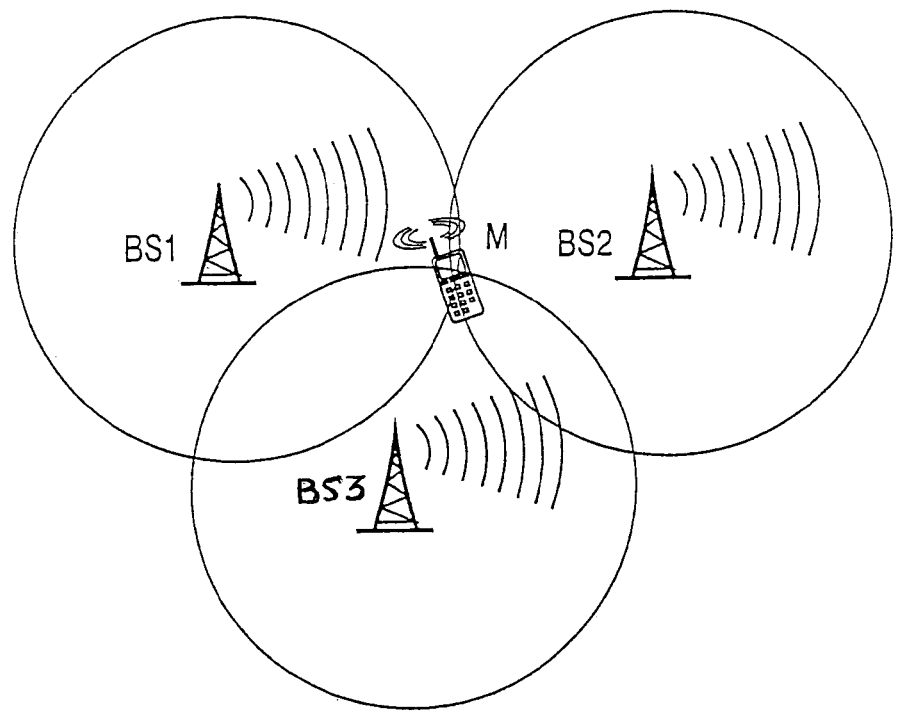
FIG. 1 is a schematic diagram illustrating how a known method of position determination might be employed in an arrangement including aspects of an embodiment of the method of the invention.

In this ideal scenario, and as illustrated in FIG. 1, the mobile can be considered as located in the interception point of three circles each having its centre at the location of the transmitting basestations, and as having radius the distance travelled by the rays to arrive to the mobile.

In mathematical terms, this can be represented by the following three equations whose solution will provide the mobile with its position:

$$\begin{cases} (x-x\_BS_1)^2 + (y-y\_BS_1)^2 + (z-z\_BS_1)^2 = R_1^2 \\ (x-x\_BS_2)^2 + (y-y\_BS_2)^2 + (z-z\_BS_2)^2 = R_2^2 \\ (x-x\_BS_3)^2 + (y-y\_BS_3)^2 + (z-z\_BS_3)^2 = R_3^2 \end{cases}$$

where x,y,z are the unknown co-ordinates of the mobile, $(x\_BS_1, y\_BS_1)$, $(x\_BS_2, y\_BS_2)$, $(x\_BS_3, y\_BS_3)$ are the co-ordinates of the basestations and $R_1$, $R_2$, $R_3$ are the distances calculated from the propagation time measured.

A solution of this system is possible both in a closed form and with an iterative method and algorithms for performing these calculations have been implemented and tested with Matlab.

The closed form implementing is derived from an efficient algorithm by Manolakis (IEEE Transactions on Aerospace and Electronic Systems, Vol. 32, No. 4, 1996 pp 1239–1248) based on the linearisation of the equation by operating on differences of distances rather than single distances. This provides the solution in one step. Alternatively the iterative method (Newton) starts from a guess introduced by the user (for example the position of the home basestation), and will converge to the solution of the system in a certain number of steps. This requires more computational effort because of the least square minimisation required at each step of the process. The results produced by both methods are very similar and consistent with the expectations.

The above however is an ideal scenario and, in reality during the transmission, there is a path loss in addition to multipath distortion, and therefore the signal arriving to the receiver will not be perfect. However, the signal can still contain enough information to allow the detection of a peak whose position will vary proportionally to the time delay of propagation. The illustration of FIG. 1 is only a simplification of reality, and, in a practical situation, the estimated propagation-delay time will be influenced by the particular environment and associated mulitpath effects, and atmospheric noise and signal level conditions. Each of the circles plotted from each basestation will in this case become an annulus defined by a ring region between the maximum and minimum point of interception, will vary for each measurement, and will define a region of uncertainty with possible estimate around the position of the mobile.

The limitation of the TOA method is associated with the assumptions needed to render it practicable. The mobile will have to reach accurate synchronisation with each of the base stations or have to know the exact delay in the transmission of the synch codes between its home basestation and the others. This is necessary in order to calculate the propagation delay of the synchronisation signal from each of the base stations. If the mobile couldn't obtain such information, it could not determine when to start the correlation mechanism or how to distinguish between synchronisation and propagation-delay time. The accuracy of the synchronisation will affect the accuracy of the location estimate. For example, a 1 us inaccuracy in the synchronisation will result in 300 m error in the position. In order to introduce an additional error—for example—less than 50 meters, the inaccuracy of the synchronisation with other base stations should not be greater than 166 ns.

The implementation of a TOA system would therefore be made very expensive by these synchronisation requirements necessary between the mobile and each of the transmitters in order to obtain a correct absolute time.

A slightly modified version of the positioning algorithm is known and referred to as the Time Difference Of Arrival (TDOA). Rather than employing absolute distances, three pseudodistances, calculated as the curves at constant difference between two particular base stations and the mobile are calculated. This would allow the position determination to be the independent from the absolute timing in the mobile, because each of the timing errors will cancel out.

Figure 3:
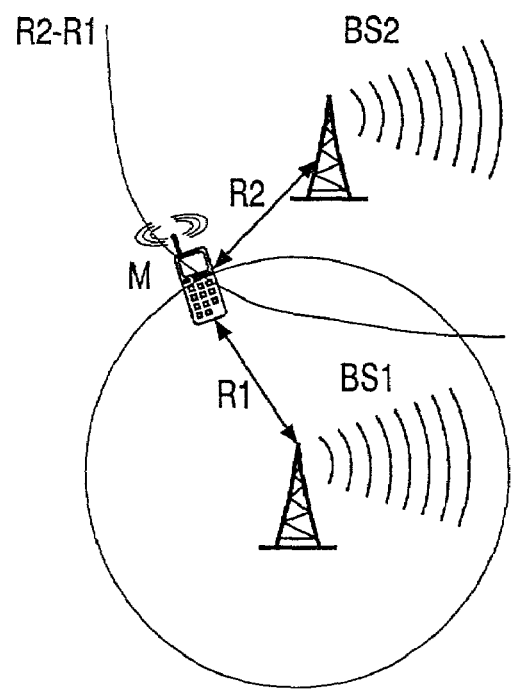
FIG. 3 is a schematic diagram illustrating an embodiment of the method and system of the invention.

The basic principle is the same as in the TOA system, with the base station broadcasting messages that the mobile would seek to decode. As before, the mobile will calculate the estimates of the propagation delays from each of the three base station, but this time, the calculations would be based on the lines at constant distance between two given independent basestations. This is illustrated in FIG. 3.

Figure 2:
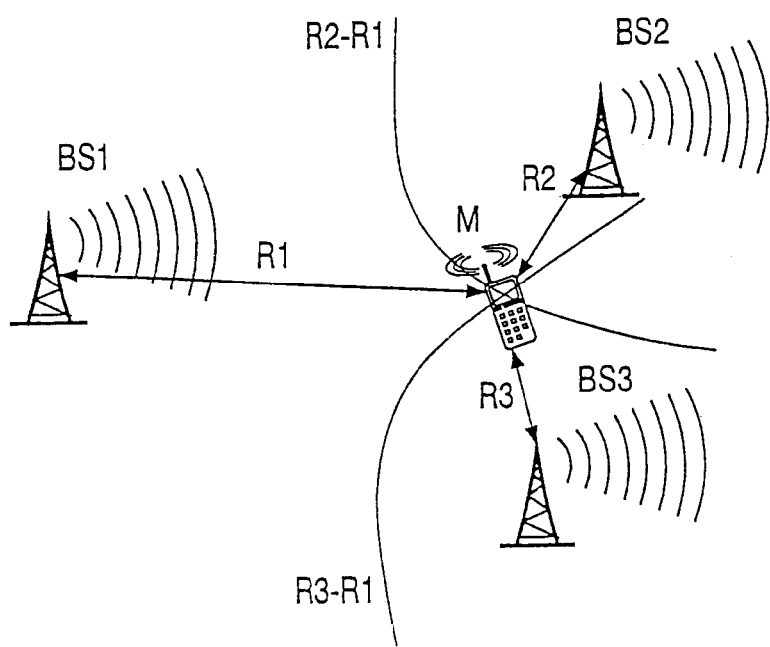
FIG. 2 is a schematic diagram illustrating how another known method of position determination might be employed in an arrangement including aspects of an embodiment of the method of the invention.

The three measurement required are the distances, or their estimates i.e. the pseudo-distances of the mobile from each of the base station. Two such measurements will help define a hyperbola between the two base stations. For example, the pseudo-ranges between the mobile M and the basestations $BS_1$ and $BS_3$ respectively will provide the parameters for defining the hyperbola R3–R1 in FIG. 2. The position of the mobile M will be on this hyperbola. Using a second pair of pseudo-distances, another hyperbola R2–R1 is calculated. The mobile's position could therefore be accurately identified by the interception point of the two hyperbolae R3–R1 and R2–R1.

This situation can be described in simple mathematical terms in the following equations.

$$R_1 = \sqrt{(x-x\_BS_1)^2 + (y-y\_BS_1)^2}$$

$$R_2 = \sqrt{(x-x\_BS_2)^2 + (y-y\_BS_2)^2}$$

$$R_3 = \sqrt{(x-x\_BS_3)^2 + (y-y\_BS_3)^2} \qquad (1)$$

The hyperbola at constant distance between BS1 and BS2 will be:

$$R_1 - R_2 = const = R = \sqrt{(x - x\_BS_1)^2 + (y - y\_BS_1)^2} - \sqrt{(x - x\_BS_1)^2 + (y - y\_BS_1)^2} \quad (2)$$

Squaring each item, we will get:

$$R^2 = R_1^2 + R_2^2 - 2 \cdot R_1 \cdot R_2 \quad (3)$$

which can be re-written and squared again to eliminate the terms under square root:

$$(R^2 - R_1^2 - R_2^2)^2 = 4 R_1^2 \cdot R_2^2 \quad (4)$$

Simplifying this equation will become:

$$R_1^4 + R_2^4 - 2 \cdot R^2 \cdot R_1^2 - 2 \cdot R^2 \cdot R_2^2 + R^4 - 2 R_1^2 \cdot R_1^2 \quad (5)$$

Putting back equation (1) in equation (5) and simplifying, the hyperbola equation in the simpler can be expressed in the following form:

$$F(x,y) = C_{11} \cdot x^2 + C_{81} \cdot x \cdot y + C_{91} \cdot x + C_{31} \cdot y^2 + C_{41} \cdot y + C_{51} = 0 \quad (6)$$

where (x,y) are the unknown co-ordinates of the mobile; $C_{11}$, $C_{81}$, $C_{91}$, $C_{31}$, $C_{41}$, $C_{51}$ are function of the basestations (known) co-ordinates; and $(x_{13}$ $BS_1$, y_$BS_1$), (x_$BS_2$, y_$BS_2$), (x_$BS_3$, y_$BS_3$) and R (measured difference of distances), and can therefore be considered constants with respect to x and y.

Using also the second hyperbolic equation, a system of simultaneous equations can be provided that can be solved deriving the position of the mobile:

$$\begin{cases} f(x, y) = C_{11} \cdot x^2 + C_{81} \cdot x \cdot y + C_{91} \cdot x + C_{31} \cdot y^2 + C_{41} \cdot y + C_{51} = 0 \\ g(x, y) = C_{12} \cdot x^2 + C_{82} \cdot x \cdot y + C_{92} \cdot x + C_{32} \cdot y^2 + C_{42} \cdot y + C_{52} = 0 \end{cases} \quad (7)$$

where $C_{ij}$ are constant with respect to the unknown (x,y).

According to the definitions given above, it is possible to arrive at the following:
For
f(x,y)=>(A,B)=(x_$BS_1$, y_$BS_1$), (C,D)=(x_$BS_2$, y_$BS_2$)
R=$R_{1,2}$=c·abs((pseudorange1−pseudorange2))
g(x,y)=>(A,B)=(x_$BS_1$, y_$BS_1$), (C,D)+(x_$BS_3$, y_$BS_3$)
R=$R_{1,3}$=c·abs((pseudorange1−pseudorange3))

The system of simultaneous equations (7) can be solved with an iterative method based on Taylor series and Newton iterations, or a close form solution as for example the one proposed by Chan (IEEE transactions on signal processing, Vol. 42, No. 8, August 1994). Both methods can be extended to include measures from more than 3 base stations or weight them, but the Chan method has the intrinsic advantage of being a one-step solution.

The manner of solving these equations is standard and do not discussed here in any greater detail save that in the TDOA system, (n+1) measurements to calculate are required to calculate the n-dimensional position of the mobile. Thus for obtaining a two-dimensional position fix, it will be necessary for the mobile to access at least three base stations.

The method embodying the present invention advantageously employs a mixed TOA and TDOA system. While the mobile has difficulty in synchronising with the adjacent base-stations, but it can synchronise and calculate correctly the absolute time of arrival with its own, i.e. "home"-base-station. Therefore it is possible to use one TOA equation and couple it into a system with the hyperbola at constant distance between the home base-station and a neighboring base station. In this case, the mobile will require access to only two base-stations to be able to calculate a position fix.

Such a system is illustrated with reference to FIG. 3 where it will be noted that the mobile will require further information to distinguish which of the two-interception points is the correct one. This further information needs to be known for the position fix. It can be obtained using for example information on which sector is transmitting the code. In fact, the 3GPP typical cell will be divided three sectors and each of these will probably have a difference code. Alternatively, it can be derived using TOA approximation and ignoring the synchronisation errors.

Even if this additional information is not available to the mobile, the method can still be used for tracking the position of the mobile instead then calculating it in a 'cold' situation (when no information is available at all). In fact assuming the mobile has already a correct, or near correct, estimation of its position, it will be generally simple to determine which of the two solutions represents the position and continue tracking its movements. This estimate will be a good guess for the TDOA-Taylor method, and the method will converge to the right solution.

This second scenario can also prove very useful in many cases where other methods fail. For example, it may prove possible to calculate the two-dimensional position of a mobile with measurements coming from three base stations in a simple TDOA system. However, should the user enter into an area with a sudden signal fade, for example an 'urban canyon', where maybe only two basestations remain visible, the TDOA method on its own would not provide any useful information and the user could not get any position reply. The position service will fail completely within these areas with the "standard" method. This failure could prove most problematic if the user needs urgent contact with, for example, the emergency services. In those same cases, and employing the concept of the present application, the user will be able to have the mobile's position calculated by this mixed algorithm.

Turning to the mathematical details of the algorithm itself: keeping the same notation as in (7) above we can write the new system for this combined TOA and TDOA case as:

$$\begin{cases} f(x, y) = C_{11} \cdot x^2 + C_{81} \cdot x \cdot y + C_{91} \cdot x + C_{31} \cdot y^2 + C_{41} \cdot y + C_{51} = 0 \\ g(x, y) = (x - x_{BS1})^2 + (y - y_{BS1})^2 = R_1^2 \end{cases} \quad (8)$$

where the terms $C_{ij}$ are constant respect to the unknown (x,y) and their expression is the same as defined above; $R_1$ is the (accurate pseudorange calculated between the home base-station and the mobile; and $x_{BS1}$, $y_{BS1}$ are the known co-ordinates of the home basestation. This system can be solved in a similar manner to equation (7).

Figure 4:
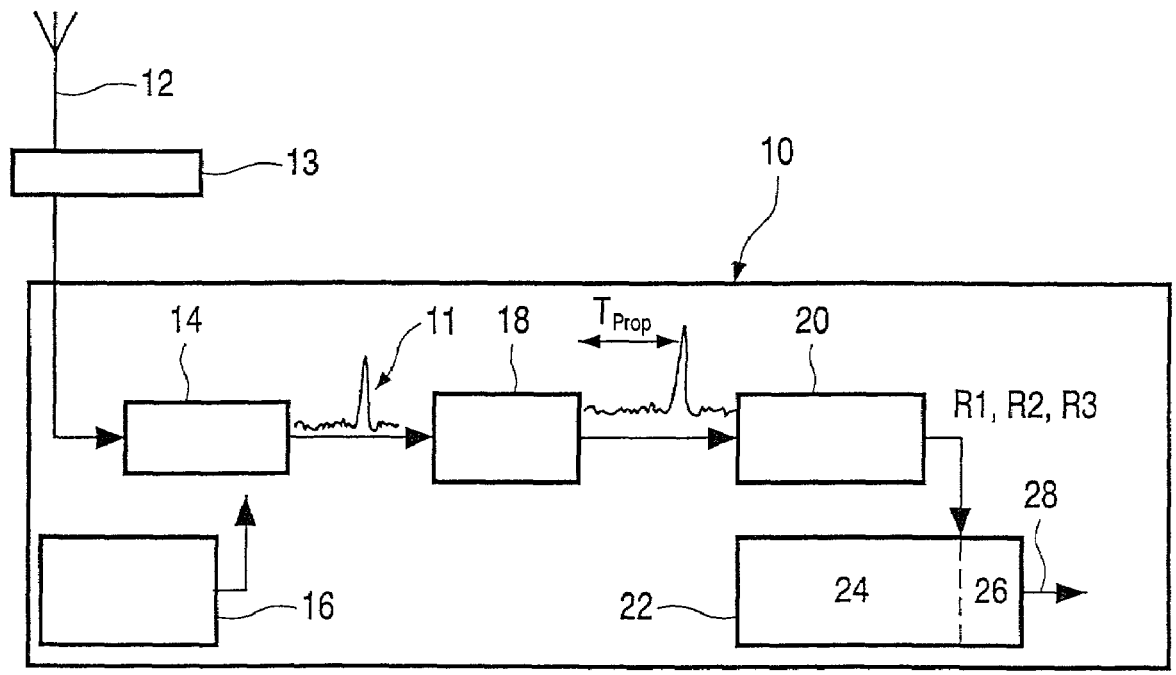
FIG. 4 is a schematic block diagram of a mobile radio terminal according to an embodiment of one aspect of the invention.

FIG. 4 is a schematic block diagram of the baseband processing functionality 10 of a mobile terminal embodying one aspect of the present invention and including an aerial 12 for receiving signals, i.e. the downlink channel, from at least two basestations and for delivering signals to the baseband processing arrangement 10 by way of the RF section 13 of the mobile terminal. The baseband processing arrangement 10 includes an arrangement for conducting TOA and TDOA calculations on the downlink traffic to advantageously render a position fix available directly at the mobile. The arrangement comprises a correlator 14 for receiving both the downlink traffic from the RF section 13 and also a locally generated replica code from code generator 16. The correlation result 11 is delivered to a peak detector 18, which in turn delivers the signal to an interpolation unit 20. The output from the interpolation unite 20 is delivered to a position fix calculation unit 22 comprising a TOA sub-unit 24 and a TDOA sub-unit 26. The output position fix data 28 is then calculated and available directly, at the mobile terminal.

Thus in accordance with the present invention, there is provided a mobile radio terminal and related method of determining the position thereof, in which the position determination calculation is conducted on the downlink channel so as to be calculated directly at the mobile terminal. The positional information is therefore available at the mobile terminal without requiring any additional data transmission steps from the base stations.

The invention claimed is:

1. A method of determining a position of a mobile radio terminal arranged for communication with a plurality of base stations, comprising:
   employing exactly one Time Of Arrival calculation in combination with a Time Difference Of Arrival calculation, the combined Time Of Arrival and Time Difference Of Arrival calculations performed on signals transmitted in a downlink communication channel from the base stations to the mobile radio terminal, and
   receiving sector information, including which sector of a cell the mobile radio terminal is located, whereby the position of the mobile radio terminal is determinable by signals from two of the base stations including the sector information, wherein the Time Of Arrival calculation is performed exclusively on signals received from the base station with which the mobile radio terminal is in registration.

2. The method as claimed in claim 1, wherein the mobile radio terminal comprises a cellular telephone.

3. The method of claim 1, wherein the position of the mobile radio terminal is determinable using a replica code, the replica code correlated with at least one of the signals from the two base stations to produce a correlation result. a peak in the correlation result used to determine the position of the mobile radio terminal.

4. A mobile radio system, comprising:
   a plurality of base stations; and
   a mobile radio terminal arranged for communication with one or more of the base stations, wherein the mobile radio terminal includes a calculation device which performs Time Of Arrival and Time Difference Of Arrival calculations on signals transmitted in a downlink channel from the base stations, wherein the calculation device combines exactly one Time Of Arrival calculation with a Time Difference Of Arrival calculation and sector information including which sector of a cell the mobile radio terminal is located to determine a position of the radio terminal, whereby the position of the mobile radio terminal is determinable from signals from two of the base stations, wherein the Time Of Arrival calculation is performed exclusively on signals received from the base station with which the mobile radio terminal is in registration.

5. The system as claimed in claim 4, wherein the mobile radio terminal comprises a cellular telephone.

6. The mobile radio system of claim 4, wherein the mobile radio terminal is synchronized with only one of the two base stations.

7. The mobile radio system of claim 4, wherein the position of the mobile radio terminal is determinable using a replica code, the replica code correlated with at least one of the signals from the two base stations to produce a correlation result, a peak in the correlation result used to determine the position of the mobile radio terminal.

8. A mobile radio terminal, comprising:
   a calculation device which performs combined Time Of Arrival and Time Difference Of Arrival calculations on signals transmitted from at least two base stations, wherein the calculation device combines exactly one Time Of Arrival calculation with a Time Difference Of Arrival calculation and sector information including which sector of a cell the mobile radio terminal is located to determine a position of the radio terminal, and whereby the position of the mobile radio terminal is determinable from signals from two of the base stations, wherein the calculation device is arranged to perform the Time Of Arrival calculation exclusively on signals received from the base station with which it is registered.

9. The mobile radio terminal as claimed in claim 8, wherein the mobile radio terminal comprises a cellular telephone.

10. The mobile radio terminal of claim 8, wherein the mobile radio terminal is synchronized with only one of the two base stations.

11. The mobile radio terminal of claim 8, wherein the position of the mobile radio terminal is determinable using a replica code, the replica code correlated with at least one of the signals from the two base stations to produce a correlation result, a teak in the correlation result used to determine the position of the mobile radio terminal.

12. A mobile radio system, comprising:
   a plurality of base stations; and
   a mobile radio terminal arranged for communication with one or more of the base stations, wherein the mobile radio terminal includes:
      means for performing a Time Of Arrival calculation on signals transmitted in a downlink channel from the base stations, and
      means for performing a Time Difference Of Arrival calculation on signals transmitted in the downlink from the base stations, wherein a result of a position determination calculation combining exactly one Time of Arrival calculation with a Time Difference Of Arrival calculation and sector information including which sector of a cell the mobile radio terminal is located is available directly at the mobile radio terminal; and
   whereby the position of the mobile radio terminal is determinable from signals from two of the base stations, wherein the Time Of Arrival calculation is performed exclusively on signals received from the base station with which the mobile radio terminal is in registration.

13. The mobile radio system of claim 12, wherein the position of the mobile radio terminal is determinable using a replica code, the replica code correlated with at least one of the signals from the two base stations to produce a correlation result, a peak in the correlation result used to determine the position of the mobile radio terminal.

14. A mobile radio terminal, comprising:
a calculation device which performs a combination of exactly one Time Of Arrival calculation and a Time Difference Of Arrival calculation on signals transmitted from less than three base stations, wherein a location of the mobile radio terminal is determined using the signals from the less than three base stations and sector information including which sector of a cell the mobile radio terminal is located, and wherein the calculation device is arranged to perform the Time Of Arrival calculation exclusively on signals received from the base station with which it is registered.

15. The mobile radio terminal of claim 14, wherein the mobile radio terminal is synchronized with only one of the less than three base stations.

16. The mobile radio terminal of claim 14, wherein the position of the mobile radio terminal is determinable using a replica code, the replica code correlated with at least one of the signals from the less than three base stations to produce a correlation result, a peak in the correlation result used to determine the position of the mobile radio terminal.

17. The mobile radio terminal of claim 14, wherein said calculation device is configured to determine the location of the mobile radio terminal further using an approximation of a further Time Of Arrival signal ignoring synchronization errors.

* * * * *